3,329,671
CARBOXYLIC ACID AMIDE MONOAZO DYESTUFFS
Karl Ronco, Riehen, Switzerland, assignor to Ciba Limited, Basel, Switzerland, a Swiss company
No Drawing. Filed Apr. 6, 1964, Ser. No. 357,782
Claims priority, application Switzerland, May 14, 1962, 5,768/62
7 Claims. (Cl. 260—204)

This application is a continuation-in-part of my copending application Ser. No. 279,633, filed May 10, 1963, and now abandoned.

The present invention provides valuable new carboxylic acid amide azo dyestuffs free from groups imparting solubility in water, especially sulphonic acid and carboxylic acid groups, which correspond to the general formula

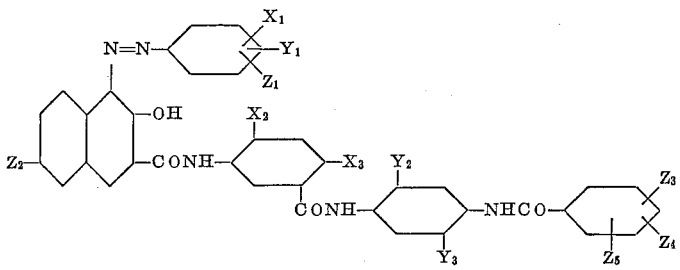

in which $X_1$ represents a member selected from the group consisting of halogen, nitro, trifluoromethyl, carbalkoxy and cyano, $Y_1$ represents a member selected from the group consisting of hydrogen, halogen and trifluoromethyl, $Z_1$ and $Z_2$ represent members selected from the group consisting of hydrogen and halogen atoms, $X_2$ is a member selected from the group consisting of hydrogen, methyl, methoxy and halogen, $X_3$ is a member selected from the group consisting of hydrogen, chlorine and methoxy, $Y_2$ and $Y_3$ represent members selected from the group consisting of hydrogen, methoxy, methyl, and chlorine $Z_3$, $Z_4$ and $Z_5$ represent members selected from the group consisting of hydrogen, halogen, methyl, lower alkoxy, lower carbalkoxy and phenyl.

The new dyestuffs are obtained when (a) a halide of a mono-carboxylic acid of the formula (3) 

free from acidic groups imparting solubility in water is condensed in a molar ratio of 1:1 with an amine of the formula (4)     $H_2N—R_3—CONH—R_4—NHCOR_5$ or (b) a halide of a mono-carboxylic acid of the formula (5) 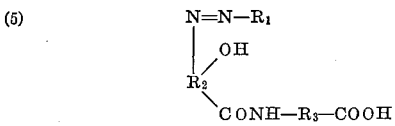

free from acidic groups imparting solubility in water is condensed in a molar ratio of 1:1 with an amine of the formula (6)     $H_2N—R_4—NHCOR_5$ in which formulae the residues $R_1$ to $R_5$ have the meanings given above.

The azo-carboxylic acids of the Formula 3 are obtained by coupling a diazo compound of an aromatic monoamine free from acidic groups imparting solubility in water, especially an aminobenzene, with a 2-hydroxy-3-naphthoic acid. The following amines may be mentioned as diazo bases:

4-amino-3-nitrotrifluoromethylbenzene,
5-amino-2-nitrotrifluoromethylbenzene,
3-amino-4-nitrotrifluoromethylbenzene,
4-chloro-2-nitro-1-aminobenzene,
3-aminotrifluoromethylbenzene,
5-chloro-2-aminobenzoic acid methyl ester,
anthranilic acid methyl ester,
2:4:5-trichloro-1-aminobenzene,
2:5-dichloro-1-aminobenzene,
2:4:6-trichloro-1-aminobenzene,
4-methyl-2-nitro-1-aminobenzene,
2-methyl-5-nitro-1-aminobenzene,
2-nitro-1-aminobenzene,
3-nitro-1-aminobenzene,
2:4-dinitro-1-aminobenzene,
5-methyl-2-methoxy-1-aminobenzene,
2:5-difluoro-1-aminobenzene,
3:5-di-(trifluoromethyl)-1-aminobenzene,
4-chloro-3-amino-trifluoromethylbenzene,
2-methyl-5-chloro-1-aminobenzene,
2-methoxy-5-nitro-1-aminobenzene,
2-nitro-4-methoxy-1-aminobenzene,
2-methoxy-5-chloro-1-aminobenzene and
4-nitro-2-cyano-1-aminobenzene.

The azo-carboxylic acids of the Formula 5 are obtained either by coupling a diazo compound of one of the above-mentioned aromatic monoamines with a carboxylic acid of the formula (7) 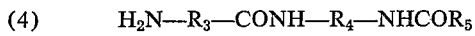

in which $R_2$ and $R_3$ have the meanings given above, or by condensing a halide of a mono-carboxylic acid of the Formula 3 with an amino carboxylic acid of the formula $H_2N—R_3—COOH$ The azo-carboxylic acids obtained are treated with agents capable of converting carboxylic acids into their acid halides, for example, their acid chlorides or bromides, such agents being more especially phosphorus halides, for example, phosphorus pentabromide, phosphorus trichloroide or phosphorus pentachloride, phosphorus oxyhalides or advantageously thionyl chloride. The treatment with such acid halogenating agents is advantageously carried out in an inert organic solvent, for example, dimethyl formamide, a chlorobenzene, for example, mono- or di-chlorobenzene, toluene, xylene or nitrobenzene. If desired the last five named solvents can be used in the presence of dimethyl formamide.

In the manufacture of the carboxylic acid halides it is generally of advantage first of all to dry the azo compounds, which are prepared in aqueous medium, or to free them from water by azeotropic distillation with an organic solvent. If desired, this can be carried out immediately before the treatment with the acid hologenating agents.

In method (a) of the present invention the monocarboxylic acid chlorides obtained as described above are condensed in a molar ratio of 1:1 with aromatic monoamines of the Formula 4. As example the following amines may be mentioned:

1:4-dichloro-2-benzoylamino-5-(4'-chloro-3'-amino)-benzylaminobenzene,
1:4-dichloro-2-benzoylamino-5(2':4'-dichloro-5'-amino)-benzoylaminobenzene,
1:4-dichloro-2-benzoylamino-5-(3'-amino)-benzoylaminobenzene,
1:4-dichloro-2-benzoylamino-5-(4'-methoxy-3'-amino)-benzoylaminobenzene,
1:4-dimethyl-2-benzoylamino-5(3'-amino)-benzoylaminobenzene,
1:4-dimethyl-2-benzoylamino-5(4'-chloro-3'-amino)-benzoylaminobenzene,
1:4-dimethyl-2-benzoylamino-5(4'-methoxy-3'-amino)-benzoylaminobenzene,
1-chloro-4-methoxy-2-benzoylamino-5-(4'-methoxy-3'-amino)-benzoylaminobenzene,
1-chloro-4-methoxy-2-benzoylamino-5-(4'-chloro-3'-amino)-benzoylaminobenzene,
1-methyl-4-chloro-2-benzoylamino-5-(4-methoxy-3'-amino)-benzoylaminobenzene,
1-methyl-4-chloro-2-benzoylamino-5-(4'-chloro-3'-amino)-benzoylaminobenzene,
1-chloro-4-methoxy-2-benzoylamino-5-(3'-amino)-benzoylaminobenzene,
1-methyl-4-chloro-2-benzoylamino-5-(3'-amino)-benzoylaminobenzene,
1:4-dimethyl-2-benzoylamino-5-(2':4'-dichloro-5'-amino)-benzoylaminobenzene,
1:4-dichloro-2(4'-chloro)-benzoylamino-5(4''-chloro-3''-amino)-benzoylaminobenzene,
1:4-dichloro-2(4'-chloro)-benzoylamino-5(2'':4''-dichloro-5''-amino)-benzoylaminobenzene,
1:4-dichloro-2(4'-chloro)-benzoylamino-5(4''-chloro-3''-amino)-benzoylaminobenzene,
1:4-dichloro-2(2':4'-dichloro)-benzoylamino-5-(2'':4''-dichloro-5''-amino)-benzoylaminobenzene,
1:4-dichloro-2:α-naphthoylamino-5(2':4'-dichloro-5'-amino)-benzoylaminobenzene and
1:4-dichloro-2(2':4'-dichloro)-benzoylamino-5(3''-amino)-benzoylaminobenzene.

The condensation of the above described carboxylic acid halides with the amines is advantageously carried out in an anhydrous medium. Under these conditions the condensation generally takes place surprisingly quickly at temperatures within the boiling range of the common organic solvents, for example, toluene, monochlorobenzene, dichlorobenzene, trichlorobenzene, nitrobenzene, and the like. In order to accelerate the reaction, it is generally of advantage to add an agent capable of binding acid, for example, anhydrous sodium acetate or pyridin. Some of the dyestuffs obtained are crystalline and some are amorphous and they are generally obtained in a good yield and in a pure form. It is of advantage first to separate the acid halides but in some cases this may be dispensed with without trouble, and the condensation carried out immediately following the formation of the carboxylic acid halide.

The new dyestuffs are valuable pigments which can be used for a very wide variety of purposes. They are generally obtained in such a form that special processing is not required. They are particularly suitable for the spin-dyeing of rayon, viscose, cellulose ethers or esters, polyamides, polyurethanes or polyesters. They may also be used for the manufacture of coloured lacquers or lake formes, in which application they are distinguished by a good fastness to overstripe bleeding, and for the colouration of solutions or products of cellulose acetate, nitrocellulose, natural or synthetic resins, for example polymerization or condensation resins, such as aminoplasts, alkyl resins, phenoplasts, polyolefines such as polystyrene, polyvinylchloride, polyethylene, polypropylene, poly acrylonitrile, rubber, casein, silicone and silicone resins. They can also advantageously be used in the manufacture of coloured pencils, cosmetic preparations or laminated sheet material.

The following examples illustrate the invention. Unless otherwise stated, the parts and percentages are by weight:

*Example 1*

122 parts of the dyestuff, obtained by diazotising 4-trifluoromethyl-2-nitro-1-aminobenzene in glacial acetic acid or with nitrosyl sulphuric acid and coupling with 2:3-hydroxynaphthoic acid, were heated, while stirring, for 1 hour at 115 to 120° C. with a mixture of 1000 parts of ortho-dichlorobenzene, 5 parts of dimethylformamide and 50 parts of thionyl chloride. After cooling the reaction mixture, the homogeneously crystalline mono-carboxylic acid chloride of the dyestuff so obtained was isolated by filtration, washed with a small amount of cold orthodichlorobenzene and benzene, and then dried in vacuo at 55 to 60° C.

17 parts of this acid chloride were added to 800 parts of cold ortho-dichlorobenzene while stirring. A warm solution of 18 parts of 1:4-dichloro-2-benzoylamino-5(4'-chloro-3'-amino)-benzoylaminobenzene in 400 parts of ortho-dichlorobenzene were then added and the mixture stirred for 12 hours at 140 to 145° C. After the condensation, the pigment, consisting of small bent needles, was filtered while hot, washed successively with hot orthodichlorobenzene, hot benzene, methanol and water and then dried in vacuo at 70 to 80° C. The condensation product of the formula

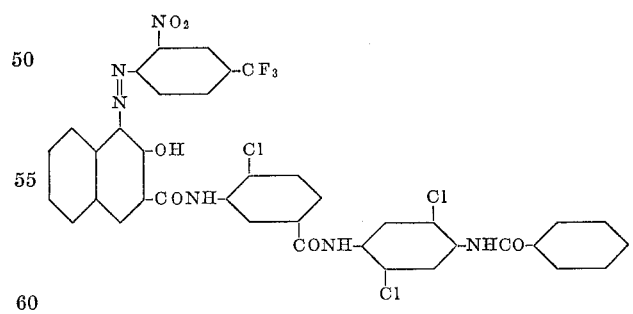

was a yellow-orange pigment sparingly soluble to insoluble in the usual solvents and coloured polyvinyl chloride foils yellow-orange tints possessing an excellent fastness to light and to migration.

The azo dyestuff mono-carboxylic acids obtained from the diazo components listed in Column I of the following table and the coupling components listed in Column II were reacted via the dyestuff mono-carboxylic acid chlorides in the manner described in Example 1 with 1 mol of the aromatic polynuclear amines listed in Column III. Column IV shows the tints of polyvinyl chloride foils prepared with these pigments.

| No. | I | II | III | IV |
|---|---|---|---|---|
| 1 | 4-trifluoromethyl-2-nitro-1-aminobenzene. | 2:3-hydroxynaphthoic acid | 1:4-dichloro-2-benzoyl-amino-5(2':4'-dichloro-5'-amino)-benzoylaminobenzene. | Yellow orange. |
| 2 | ....do.... | ....do.... | 1:4-dimethyl-2-benzoyl-amino-5(2':4'-dichloro-5'-amino)-benzoylaminobenzene. | Do. |
| 3 | ....do.... | ....do.... | 1-chloro-4-methoxy-2-benzoylamino-5-(4'-methoxy-3'-amino)-benzoylaminobenzene. | Orange. |
| 4 | ....do.... | ....do.... | 1:4-dichloro-2(4'-chloro)-benzoylamino-5(4''-chloro-3''-amino)-benzoylaminobenzene. | Yellow orange. |
| 5 | ....do.... | ....do.... | 1:4-dichloro-2(4'-chloro)-benzoylamino-5(2'':4''-dichloro-5''-amino)-benzoylaminobenzene. | Do. |
| 6 | ....do.... | ....do.... | 1:4-dichloro-2(4'-methyl)-benzoylamino-5(4''-chloro-3''-amino)-benzoylaminobenzene. | Do. |
| 7 | ....do.... | ....do.... | 1:4-dichloro-2(4'-methyl)-benzoylamino-5(2'':4''-dichloro-5''-amino)-benzoylaminobenzene. | Do. |
| 8 | ....do.... | ....do.... | 1:4-dichloro-2(2':4'-dichloro)-benzoylamino-5(2'':4''-dichloro-5''-amino)-benzoylaminobenzene. | Do. |
| 9 | ....do.... | ....do.... | 1:4-dichloro-2:α-naphthoylamino-5(2':4'-dichloro-5'-amino)-benzoylaminobenzene. | Orange. |
| 10 | ....do.... | ....do.... | 1-methyl-2-benzoylamino-4-chloro-5(4'-methoxy-3'-amino)-benzoylaminobenzene. | Do. |
| 11 | ....do.... | ....do.... | 1:4-dichloro-2-benzoyl-amino-5(3'-amino)-benzoylaminobenzene. | Do. |
| 12 | ....do.... | ....do.... | 1:4-dimethyl-2-benzoyl-amino-5(3'-amino)-benzoylaminobenzene. | Do. |
| 13 | ....do.... | ....do.... | 1:4-dimethyl-2-benzoylamino-5(4'-chloro-3'-amino)-benzoylaminobenzene. | Do. |
| 14 | 4-nitro-3-trifluoromethyl-1-aminobenzene. | ....do.... | 1:4-dimethyl-2-benzoylamino-5(2':4'-dichloro-5'-amino)-benzoylaminobenzene. | Do. |
| 15 | ....do.... | ....do.... | 1:4-dichloro-2-(4'-chloro)-benzoylamino-5(2'':4''-dichloro-5''-amino)-benzoylaminobenzene. | Yellow-orange. |
| 16 | 3:5-di(trifluoromethyl)-1-aminobenzene. | ....do.... | 1:4-dichloro-2-benzoyl-amino-5(4'-chloro-3'-amino)-benzoylaminobenzene. | Yellow. |
| 17 | 5-chloro-2-amino benzoic acid methyl ester. | ....do.... | 1:4-dichloro-2-benzoylamino-5(4'-methoxy-3'-amino)-benzoylaminobenzene. | Orange. |
| 18 | ....do.... | ....do.... | 1:4-dichloro-2(4'-methyl)-benzoylamino-5(2'':4''-dichloro-5''-amino)-benzoylaminobenzene. | Do. |
| 19 | ....do.... | ....do.... | 1:4-dimethyl-2-benzoylamino-5(4'-methoxy-3'-amino)-benzoylaminobenzene. | Yellow-orange. |
| 20 | ....do.... | ....do.... | 1:4-dichloro-2(4'-chloro)-benzoylamino-5(2'':4''-dichloro-5''-amino)-benzoylaminobenzene. | Do. |
| 21 | ....do.... | ....do.... | 1:4-dichloro-2(4'-chloro)-benzoylamino-5(4''-chloro-3''-amino)-benzoylaminobenzene. | Orange. |
| 22 | 2:4:5-trichloro-1-aminobenzene | ....do.... | 1:4-dichloro-2-benzoylamino-5(3'-amino)-benzoylaminobenzene. | Red-orange. |
| 23 | ....do.... | ....do.... | 1:4-dimethyl-2-benzoylamino-5(3'-amino)-benzoylaminobenzene. | Orange. |
| 24 | ....do.... | ....do.... | 1:4-dichloro-2-benzoylamino-5(2':4'-dichloro-5'-amino)-benzoylaminobenzene. | Do. |
| 25 | ....do.... | ....do.... | 1:4-dimethyl-2-benzoylamino-5(2':4'-dichloro-5'-amino)-benzoylaminobenzene. | Do. |
| 26 | ....do.... | ....do.... | 1-chloro-2-benzoylamino-4-methoxy-5(4'-methoxy-3'-amino)-benzoylaminobenzene. | Do. |
| 27 | ....do.... | ....do.... | 1:4-dichloro-2(4'-chloro)-benzoylamino-5(4''-chloro-3''-amino)-benzoylaminobenzene. | Do. |
| 28 | ....do.... | ....do.... | 1:4-dichloro-2(4'-chloro)-benzoyl-amino-5(2'':4''-dichloro-5''-amino)-benzoylaminobenzene. | Do. |
| 29 | ....do.... | ....do.... | 1:4-dichloro-2-benzoylamino-5(4'-methoxy-3'-amino)-benzoylaminobenzene. | Orange. |
| 30 | ....do.... | ....do.... | 1:4-dimethyl-2-benzoylamino-5(4'-chloro-3'-amino)-benzoylaminobenzene. | Do. |
| 31 | ....do.... | ....do.... | 1:4-dichloro-2-benzoylamino-5(4'-methoxy-3'-amino)-benzoylaminobenzene. | Yellow-orange. |
| 32 | ....do.... | ....do.... | 1:4-dimethyl-2-benzoylamino-5(4'-methoxy-3'-amino)-benzoylaminobenzene. | Do. |
| 33 | ....do.... | ....do.... | 1-methyl-2-benzoylamino-4-chloro-5-(4'-methoxy-3'-chloro)-benzoylaminobenzene. | Do. |
| 34 | 5-trifluoromethyl-2-chloro-1-aminobenzene. | ....do.... | 1:4-dichloro-2-benzoylamino-5(2':4'-dichloro-5'-amino)-benzoylaminobenzene. | Do. |
| 35 | ....do.... | ....do.... | 1:4-dichloro-2(4'-chloro)-benzoylamino-5(4''-chloro-3''-amino)-benzoylaminobenzene. | Do. |
| 36 | ....do.... | ....do.... | 1:4-dichloro-2(4'-chloro)-benzoylamino-5(2'':4''-dichloro-5''-amino)-benzoylaminobenzene. | Do. |
| 37 | ....do.... | ....do.... | 1:4-dichloro-2-benzoylamino-5(4'-methoxy-3'-amino)-benzoylaminobenzene. | Do. |
| 38 | ....do.... | ....do.... | 1:4-dimethyl-2-benzoylamino-5(4'-methoxy-3'-amino)-benzoylaminobenzene. | Yellow-orange. |
| 39 | 2:5-difluoro-1-aminobenzene | ....do.... | 1:4-dichloro-2-benzoylamino-5(4'-methoxy-3'-amino)-benzoylaminobenzene. | Do. |
| 40 | 2-aminobenzoic acid methyl ester. | ....do.... | 1:4-dichloro-2-benzoylamino-5(4'-methoxy-3'-amino)-benzoylaminobenzene. | Do. |
| 41 | 4-chloro-2-nitro-1-aminobenzene | ....do.... | 1:4-dichloro-2-benzoylamino-5(2':4'-dichloro-5'-amino)-benzoylaminobenzene. | Orange. |
| 42 | 4-trifluoro-methyl-2-nitro-1-amino-benzene. | 6-bromo-2:3-hydroxynaphthoic acid. | 1:4-dichloro-2-benzoylamino-5(2':4'-dichloro-5'-amino)-benzoylaminobenzene. | Yellow-orange. |
| 43 | ....do.... | ....do.... | 1:4-dichloro-2(4'-chloro)-benzoylamino-5(2'':4''-dichloro-5''-amino)-benzoylaminobenzene. | Do. |
| 44 | 4-nitro-3-aminobenzotrifluoride | 2:3-hydroxynaphthoic acid | 1:4-dichloro-2-benzoylamino-5(4'-chloro-3'-amino)-benzoylaminobenzene. | Do. |
| 45 | ....do.... | ....do.... | 1:4-dichloro-2-benzoylamino-5(2':4'-dichloro-5'-amino)-benzoylaminobenzene. | Do. |
| 46 | ....do.... | ....do.... | 1:4-dichloro-2(4'-chloro)-benzoylamino-5(2'':4''-dichloro-5''-amino)-benzoylaminobenzene. | Do. |
| 47 | 4-nitro-2-cyano-1-aminobenzene | ....do.... | 1:4-dichloro-2-benzoylamino-5(4'-chloro-3'-amino)-benzoylaminobenzene. | Do. |
| 48 | 3-trifluoromethyl-1-aminobenzene. | ....do.... | 1:4-dichloro-2-benzoylamino-5(2':4'-dichloro-5'-amino)-benzoylaminobenzene. | Do. |
| 49 | ....do.... | ....do.... | 1:4-dichloro-2-benzoylamino-5(4'-chloro-3'-amino)-benzoylaminobenzene. | Do. |
| 50 | ....do.... | ....do.... | 1:4-dichloro-2(4'-chloro)-benzoylamino-5(2'':4''-dichloro-5''-amino)-benzoylaminobenzene. | Do. |
| 51 | ....do.... | ....do.... | 1:4-dichloro-2(2':4'-dichloro)-benzoylamino-5(3'':4''-dichloro-5''-amino)-benzoylaminobenzene. | Do. |

| No. | I | II | III | IV |
|---|---|---|---|---|
| 52 | 4-trifluoromethyl-2-nitro-1-aminobenzene. | 2:3-hydroxynaphthoic acid | 1:4-dichloro-2-benzoylamino-5-(3'-amino-4'-methyl)-benzoylaminobenzene. | Orange. |
| 53 | ___do___ | ___do___ | 1-chloro-4-methyl-2-benzoylamino-5-(3'-amino-4'-methoxy)-benzoylaminobenzene. | Yellow-orange. |
| 54 | ___do___ | ___do___ | 1:4-dimethoxy-2-benzoylamino-5-(3'-amino-4'-methoxy)-benzoylaminobenzene. | Red-orange. |
| 55 | ___do___ | ___do___ | 1:4-dichloro-2-(4'-phenyl)-benzoylamino-5-(3''-amino-4''-chloro)-benzoylaminobenzene. | Do. |
| 56 | ___do___ | ___do___ | 1:4-dichloro-2-(4'-methyl)-benzoylamino-5-(4''-chloro-3''-amino)-benzoylaminobenzene. | Yellow-orange. |
| 57 | ___do___ | ___do___ | 1:4-dichloro-2:α-naphthoylamino-5-(2':4'-dichloro-5'-amino)-benzoyl-aminobenzene. | Orange. |
| 58 | ___do___ | ___do___ | 1:4-dichloro-2-benzoylamino-5-(5'-amino-4'-methoxy-2'-chloro)-benzoylaminobenzene. | Do. |
| 59 | ___do___ | ___do___ | 1:4-dichloro-2-(4'-chloro)-benzoylamino-5-(5''-amino-4''-methoxy-2''-chloro)-benzoylaminobenzene. | Do. |
| 60 | ___do___ | ___do___ | 1-benzoylamino-4-(4'-chloro-3'-amino)-benzoyl-aminobenzene. | Do. |
| 61 | ___do___ | ___do___ | 1,4-dichloro-2-benzoylamino-5-(5'-amino-2',4'-dimethoxy)-benzoylaminobenzene. | Do. |
| 62 | ___do___ | ___do___ | 1,4-dichloro-2-(3',4'-dichloro)-benzoylamino-5-(4''-chloro-3''-amino)-benzoylaminobenzene. | Yellow orange. |
| 63 | ___do___ | ___do___ | 1,4-dichloro-2-(4'-carbomethoxy)-benzoylamino-5-(4''-chloro-3''-methoxy)-benzoylaminobenzene. | Orange. |
| 64 | ___do___ | ___do___ | 1,4-dimethyl-2-(4'-bromobenzoylamino-5-(4''-chloro-3''-amino)-benzoylaminobenzene. | Do. |
| 65 | ___do___ | ___do___ | 1,4-dichloro-2-(2'-fluoro)-benzoylamino-5-(4''-methoxy-3''-amino)-benzoylaminobenzene. | Do. |
| 66 | ___do___ | ___do___ | 1,4-dichloro-2-(4'-phenyl)-benzoylamino-5-(5''-amino-2'',4''-dichloro)-benzoylaminobenzene. | Do. |
| 67 | ___do___ | ___do___ | 1,4-dichloro-2-(4'-phenyl)-benzoylamino-5-(4''-chloro-3''-amino)-benzoylaminobenzene. | Do. |
| 68 | ___do___ | ___do___ | 1,4-dichloro-2-(4'-methyl)-benzoylamino-5-(4''-chloro-3''-amino)-benzoylaminobenzene. | Do. |
| 69 | ___do___ | ___do___ | 1,4-dimethyl-2-(3'-methyl)-benzoylamino-5-(4''-chloro-3''-amino)-benzoylaminobenzene. | Do. |
| 70 | ___do___ | ___do___ | 1,4-dichloro-2-(2'-methyl)-benzoylamino-5-(4''-methoxy-3''-amino)-benzoylaminobenzene. | Do. |
| 71 | ___do___ | ___do___ | 1,4-dichloro-2-(2'-methoxy)-benzoylamino-5-(4''-chloro-3''-amino)-benzoylaminobenzene. | Do. |
| 72 | ___do___ | ___do___ | 1,4-dichloro-2-(3',4',5'-triethoxy)-benzoylamino-5-(4''-chloro-3''-amino)-benzoylaminobenzene. | Do. |
| 73 | ___do___ | ___do___ | 1,4-dichloro-2-benzoylamino-5-(4'-bromo-3'-amino)-benzoylamino. | Do. |
| 74 | ___do___ | ___do___ | 1,4-dichloro-2-benzoylamino-5-(4'-fluoro-3'-amino)-benzoylaminobenzene. | Do. |
| 75 | ___do___ | ___do___ | 1-benzoylamino-4-(3'-aminobenzoyl)-aminobenzoyl. | Do. |

Example 2

15.4 parts of the mono-azo dyestuff obtained by coupling diazotized 5-chloro-2-aminobenzoic acid methyl ester with 2:3-hydroxy-naphthoic acid, were heated in a finely divided form for 1 hour at 115 to 120° C. with a mixture of 200 parts of ortho-dichlorobenzene, 5 parts of thionyl chloride and 1 part of dimethylformamide while stirring. After cooling a crystalline mono-carboxylic acid chloride was isolated by filtration, washed with benzene, and then dried in vacuo at 50 to 60° C.

6.05 parts of this acid chloride were introduced into 100 parts of ortho-dichlorobenzene, while stirring, at 100° C. A hot solution of 3.1 parts of 5-amino-4-methoxy-2-chlorobenzoic acid in 50 parts of ortho-dichlorobenzene was then added and the mixture stirred for 15 hours at 140 to 145° C. The condensation product was filtered at 100° C., washed with hot orthodichlorobenzene and benzene and then dried in vacuo at 60 to 70° C. 7.1 parts of the said condensation product, in a finely divided state, were heated for 2 hours at 115 to 120° C. in admixture with 100 parts of orthodichlorobenzene, 2 parts of thionyl chloride and 0.3 part of dimethylformamide while stirring. After cooling the reaction mixture, the mono-carboxylic acid chloride was isolated by filtration, washed with ortho-dichlorobenzene and benzene, and then dried in vacuo at 50 to 60° C. 1.17 parts of this acid chloride were introduced into 100 parts of ortho-dichlorobenzene at 100° C. while stirring. A hot solution of 0.6 part of 2:5 - dichloro-4-benzoylamino - 1 - aminobenzene in 20 parts of ortho-dichlorobenzene was then added and the mixture stirred for 14 hours at 140 to 145° C. The pigment thus formed was filtered at 120° C., washed successively with hot ortho-dichlorobenzene, benzene and methanol and water and then dried in vacuo at 50 to 60° C.

The pigment dyestuff of the formula

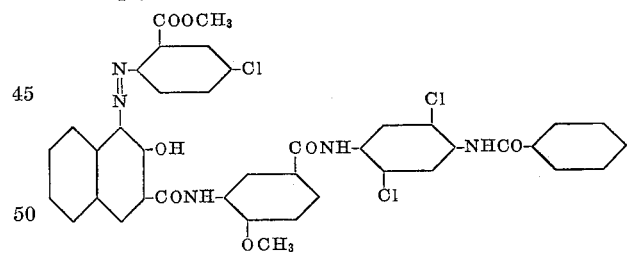

was an orange powder very sparingly soluble in organic solvents and when in a fine state of division, coloured polyvinyl chloride foils orange tints possessing a very good fastness to migration and to light.

By using 5-methyl-4-benzoylamino-2-chloro-1-aminobenzene or 5-chloro-4-benzoylamino-2-methoxy-1-aminobenzene or 2:5-dichloro-4:α-naphthoylamino - 1-aminobenzene for the condensation instead of 2:5-dichloro-4-benzoylamino-aniline, pigments possessing similar properties were obtained.

Example 3

16.5 parts of the mono-azo dyestuff obtained by coupling diazotized 4-amino-3-nitrobenzotrifluoride with 2-hydroxy-3-naphthoic acid-(2'-chloro-5'-carboxy)-phenylamide were heated for one hour at 115 to 120° C. with a mixture of 300 parts of ortho-dichlorobenzene, 4 parts of thionyl chloride and 0.5 part of dimethylformamide while stirring. After cooling, the monocarboxylic acid chloride was filtered, washed with benzene and then dried in vacuo at 50 to 60° C.

1.15 parts of this mono-carboxylic acid chloride were introduced into 80 parts of cold ortho-dichlorobenzene while stirring. 9.6 parts of 2:5-dichloro-4-benzoylamino- 1-aminobenzene in 20 parts of orthodichlorobenzene were then added, and the whole heated for 16 hours at 140 to 145° C. The pigment, which precipitated in crystalline form, was then filtered at 120° C., washed with hot ortho-dichlorobenzene, benzene, methanol and water, and then dried in vacuo at 70 to 80° C. A soft-grained, orange powder was obtained which coloured poly-vinyl chloride foil yellow-orange tints possessing an excellent fastness to light and to migration. The product had the same structural formula as that given in Example 1.

By using 2:5-dichloro-4-(4'-chloro)-benzoyl-aminoaniline instead of 2:5-dichloro-4-benzoylamino-aniline, a pigment possessing similar properties was obtained.

*Example 4*

65 parts of stabilized polyvinyl chloride, 35 parts of dioctyl phthalate and 0.2 part of the dyestuff obtained as described in the second paragraph of Example 1 were mixed together and worked to and from on a two-roll calender for 7 minutes at 140° C. A yellow-orange foil possessing a very good fastness to light and to migration was obtained.

What is claimed is:
1. An azo dyestuff of the formula

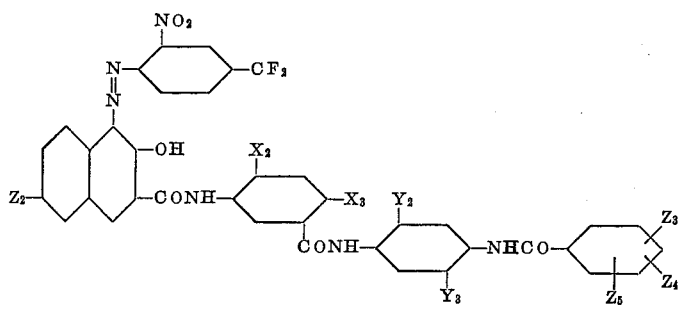

in which $Z_2$ represents a member selected from the group consisting of hydrogen and bromine atoms, $X_2$ is a member selected from the group consisting of hydrogen, methyl, methoxy and chlorine, $X_3$ is a member selected from the group consisting of hydrogen, chlorine and methoxy, $Y_2$ and $Y_3$ represent members selected from the group consisting of hydrogen, methoxy, methyl and chlorine, $Z_3$, $Z_4$ and $Z_5$ represent members selected from the group consisting of hydrogen, chlorine, methyl, lower alkoxy lower carbalkoxy and phenyl groups, and wherein the residue $Z_3$ and $Z_4$, together, can also form a fused benzene ring.

2. An azo dyestuff of the formula

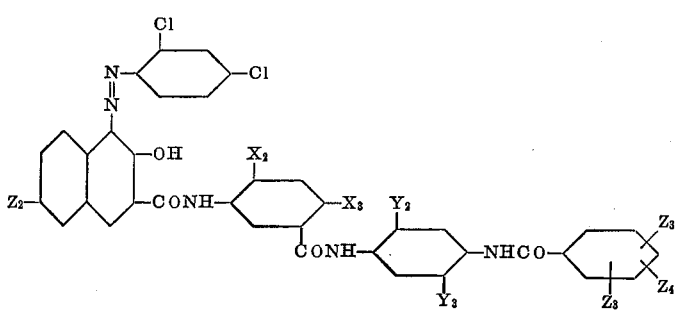

in which $Z_2$ represents a member selected from the group consisting of hydrogen and bromine atoms, $X_2$ is a member selected from the group consisting of hydrogen, methyl, methoxy and chlorine, $X_3$ is a member selected from the group consisting of hydrogen, chlorine and methoxy, $Y_2$ and $Y_3$ represent members selected from the group consisting of hydrogen, methoxy, methyl and chlorine, $Z_2$, $Z_3$ and $Z_4$ represent members selected from the group consisting of hydrogen, chlorine, methyl, lower alkoxy lower carbalokxy and phenyl groups, and wherein the residue $Z_3$ and $Z_4$, together, can also form a fused benzene ring.

3. The dyestuff of the formula

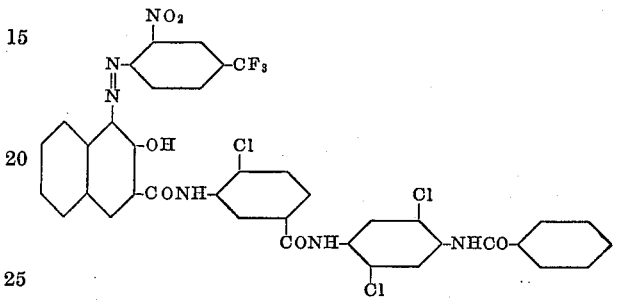

4. The dyestuff of the formula

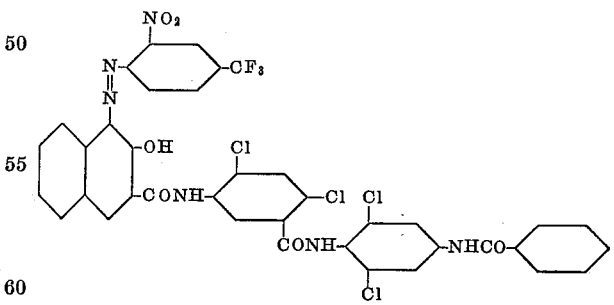

5. The dyestuff of the formula
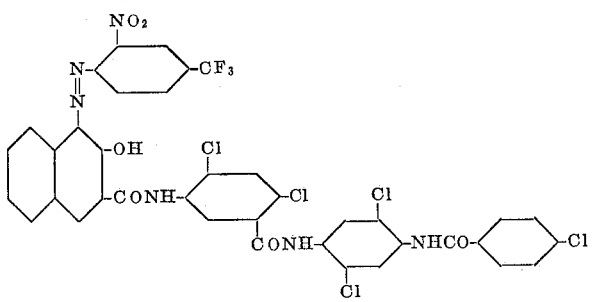
6. The dyestuff of the formula
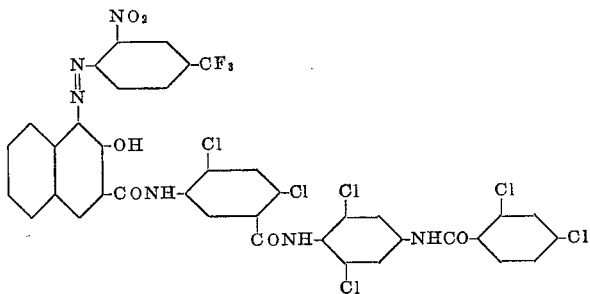
7. The dyestuff of the formula
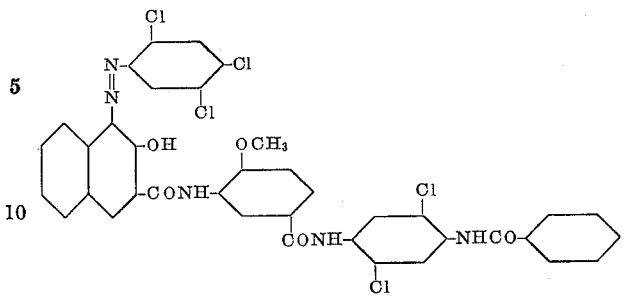
References Cited
UNITED STATES PATENTS
1,947,550   2/1934   Hitch _____ 260—204
3,124,568   3/1964   Mory et al. _____ 260—204 X
CHARLES B. PARKER, Primary Examiner.
FLOYD D. HIGEL, Assistant Examiner.